United States Patent

Smyly

[15] 3,698,412
[45] Oct. 17, 1972

[54] DIFFERENTIAL PRESSURE CONTROL
[72] Inventor: Harold M. Smyly, Huntsville, Ala.
[73] Assignee: The United States of America as represented by the Administrator of the National Aeronautics and Space Administration
[22] Filed: June 26, 1970
[21] Appl. No.: 50,208

[52] U.S. Cl. .................. 137/81, 92/49, 137/487.5
[51] Int. Cl. ............................................. F16k 31/42
[58] Field of Search .................. 137/81, 487.5; 251/61–61.5; 92/48, 49, 50, 97

[56] References Cited

UNITED STATES PATENTS

| | | | |
|---|---|---|---|
| 2,381,429 | 8/1945 | Bell et al. | 92/97 X |
| 2,678,065 | 5/1954 | Crookston | 92/49 X |
| 1,910,322 | 5/1933 | Coffin et al. | 92/97 X |

FOREIGN PATENTS OR APPLICATIONS

| | | | |
|---|---|---|---|
| 635,560 | 1/1962 | Canada | 137/487.5 |

*Primary Examiner*—M. Cary Nelson
*Assistant Examiner*—Richard Gerard
*Attorney*—L. D. Wofford, Jr., George J. Porter and John R. Manning

[57] ABSTRACT

A differential pressure control for activation in response to the difference in pressure between two applied pressures wherein one pressure is applied to an outer side of a first diaphragm and the other pressure is applied to an outer side of a second diaphragm. The inner sides of the diaphragms are positioned face to face within a central chamber to which is applied a reference pressure. An electrical switch is operated by the movement of one of the diaphragms in response to a difference in the applied pressures, which response is a function of the reference pressure, the ratio of diaphragm surface areas, and one of the applied pressures.

1 Claim, 3 Drawing Figures

PATENTED OCT 17 1972

3,698,412

Harold M. Smyly,
INVENTOR

BY
George J. Porter
ATTORNEY

Harold M. Smyly,
INVENTOR

DIFFERENTIAL PRESSURE CONTROL

ORIGIN OF THE INVENTION

The invention described herein was made by an employee of the U.S. Government and may be manufactured and used by or for the Government for Governmental purposes without the payment of any royalties thereon or therefor.

BACKGROUND OF THE INVENTION

1. Field of the Invention

This invention relates to pressure controls, sensing devices and systems and particularly includes devices adapted to provide a responsive output when a predetermined difference or ratio is sensed between two pressures.

2. Description of Prior Art

Such controls, are generally referred to as differential pressure transducers or sensor, or switches and usually employ a single diaphragm which is housed to receive one pressure on one side and another pressure on the other side and to respond by sideward deflection when one pressure exceeds the other by a predetermined amount. One of the pressures is of a fixed absolute value or is simply atmospheric pressure. Normally, the diaphragm of the transducer is coupled to a switch having at least one of a set of electrical contacts which are operated open or closed by the action of the diaphragm. In the conventional differential pressure switch, a switching action occurs in response to the difference in pressure applied, regardless of absolute value, of one of them.

SUMMARY OF THE INVENTION

In contrast, the object and purpose of the present invention is to provide a differential pressure control, with a variable characteristic, that is, with a differential response which varies as some function of the applied pressures. As an example of operation, the present invention would have application where it is desired to provide a response when the input pressures were say 10 P.S.I. and 15 P.S.I., respectively, but if the pressures increased and the first pressure became 15 P.S.I., then response would not occur until the second pressure became not 20, but 22 P.S.I. Thus, in this example, the difference pressure would be 5 P.S.I. when the first pressure was 10 P.S.I. and 7 P.S.I. when the first pressure became 15 P.S.I.

It is a further object of this invention to provide a pressure regulating system wherein the difference in two sources of pressure may be programmed to vary at some function of one of the pressures.

It is a still further object of this invention to provide a pressure regulating system in which regulation may be achieved of pressures or, for that matter, some other condition or process which is a selected function of two or even three sampled pressures.

The objects of this invention are achieved in a structure or system in which there is employed a pair of facing diaphragms wherein the inner surfaces of the diaphragms are within a chamber to which is applied a reference pressure and the outer surfaces are subjected to pressures to be compared or subtracted. Movement of a first one of the diaphragms is coupled to move the second of the diaphragms and the movement of the latter is coupled to means for registering output, such as the contacts of a switch, which are opened or closed upon predetermined movement of the diaphragms.

BRIEF DESCRIPTION OF THE DRAWINGS

These and other objects, features and advantages of the invention will become more apparent from the following description when considered together with the drawings in which.

DESCRIPTION OF THE PREFERRED EMBODIMENTS

Figure 1:
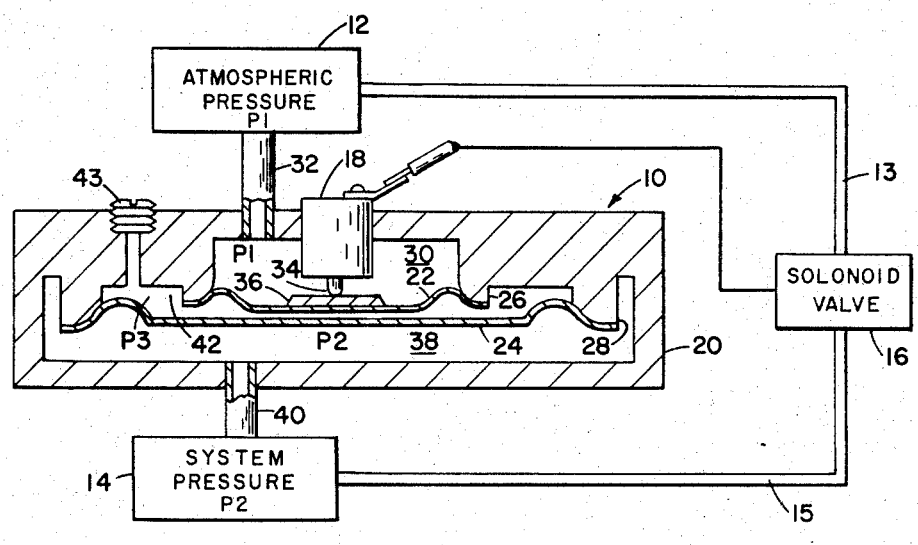
FIG. 1 is a sectional view of a pressure sensor and related components making up a pressure system as contemplated by this invention.

Referring now to FIG. 1, differential pressure sensor or transducer 10 is interconnected in a system in which it is desired to effect a programmed difference in pressure between pressure source P1 provided by tank 12 and pressure source P2 as provided by tank 14. Tanks 12 and 14 are interconnected through pipe lines 13 and 15 by solenoid valve 16 which is electrically operated open and closed by switch 18 of differential pressure transducer 10.

Considering first the structure of transducer 10, casing 20 is typically cylindrical, of stainless steel, and houses a first diaphragm 22 and second diaphragm 24. Diaphragms 22 and 24 are substantially planar as shown and are also typically of stainless steel. They are welded at the outer edge of annular lips 26 and 28, respectively, to case 20. In the example to be discussed, the effective area of diaphragm 22 equals one-half of the effective area of diaphragm 24. The diaphragms are positioned concentrically with respect to a common axis and are separated a few thousandths of an inch or are positioned with no separation. In operation, with operating pressures applied, diaphragms 22 and 24 are in contact and no clearance exists. Cavity 30 provides a first pressure chamber in the upper region of case 20 and it functions to apply pressure P1 from tank 12 through tube 32 to the upper surface of diaphragm 22. Pressure switch 18 is conventional and is supported by the upper portion of case 20. It includes a switching button 34 which engages a reinforced contact region 36 of diaphragm 22.

Cavity 38 provides a second pressure in the lower region of case 20 and it functions to receive pressure P2 through tube 40 from tank 14 and to apply pressure P2 to the bottom surface of diaphragm 24.

Annular cavity 42 provides a third pressure chamber and it is sealed by plug 43 to provide a self contained source or means of providing a reference pressure P3. Cavity 42 applies pressure P3 to the abutting annular portion of diaphragm 24, that is, to the outer portion which does not engage diaphragm 22 when pressures are applied. Thus the transfer characteristic of transducer 10 depends upon the pressure in cavity 42 and the ratio of its effective area to the area of diaphragm 22. This follows since diaphragm 24 is opposed by the sum of the forces applied by diaphragm 22 and pressure in cavity 42. Thus the pressure of diaphragm 24, applied upward (which is proportional to the pressure in tank 14), is only partially effective in moving upward diaphragm 22 in that a portion (one-half in this example) of the area of diaphragm 24 is opposed by the cavity pressure. Thus by varying the proportion of area presented by diaphragm 22 and cavity 42 to diaphragm 24, a wide variety of operating characteristics can be achieved wherein the variables are pressure in chamber 38 versus force applied to diaphragm 22.

Figure 2:
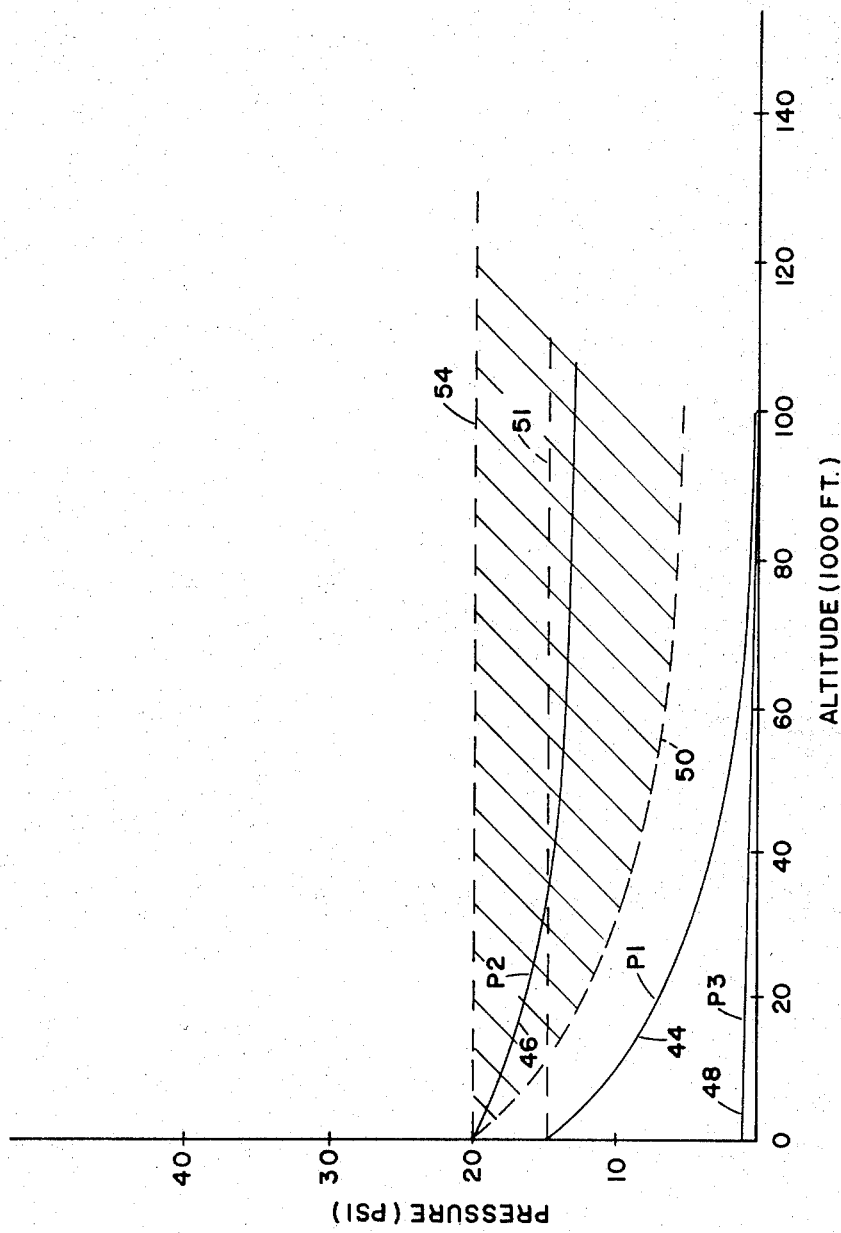
FIG. 2 is a diagram illustrating aspects of operation of the invention.

FIG. 2 is a diagram consisting of several curves with respect to which operation of transducer 10 will be explained. The curves are plotted in terms of pressure versus altitude and are so plotted to illustrate the application of the invention to the control of fuel tank pressures in a liquid propellent powered space vehicle. It was from the problem of control of such pressures that the present invention evolved. The problem was that of achieving at launch a relatively low differential pressure and then as the vehicle gained altitude to permit the differential pressure to increase in accord with a desired characteristic. Maximum initial differential pressure, that is pressure at launch, was limited by structural considerations of the tank to withstand varying stress conditions to be met during ascent. At the same time, tank pressure was required to be sufficient during ascent to start engines in space. These requirements were such that they could not be optimumly achieved by a conventional type pressure transducer in that, as will be shown, the use of a fixed pressure reference for the control of tank pressure would have resulted in an excessively high tank pressure when the vehicle reached substantial altitude, and the use of an atmospheric pressure reference would have resulted in a lower tank pressure than desired at such altitudes. As will be observed from the curves, the present invention provides a device which can be configured to provide a variable differential pressure response with increase in altitude which meets varying needs for controlling such tank pressures.

In the example illustrated, it will be assumed that tank 14 is representative of a fuel tank of a space vehicle and that tank 12 is open to the atmosphere and thus its pressure corresponds to pressure which would surround tank 14 in space.

In FIG. 2, curve 44 is a plot of atmospheric pressure P1 as a function of altitude. It commences at a figure of 14.7 P.S.I. for 0 altitude and drops to nearly 0 P.S.I. at an altitude of 100,000 feet. The operating constants of transducer 10 involve conventional design characteristics of diaphragms 22 and 24 and switch 18 and are such that in this case it is assumed that switch 18 will be operated by the upward movement of diaphragm 22 when there exists a differential pressure of approximately 12.65 pounds across diaphragm 22. This thus requires a net upward pressure to be applied to the lower side of diaphragm 22 of at least this amount for the operation of switch 18.

Curve 46 is a plot of pressure P2, the pressure in tank 14. Initially and at 0 altitude it is 20 P.S.I., having been applied to tank 14 by means not shown.

Curve 48 is a plot of reference pressure P3, which in this instance is representative of a near vacuum or 0 P.S.I.

To consider the force picture, assume, for purposes of illustration, that the upper and lower surface areas of diaphragm 24 are each one square inch and that the upper and lower surface areas of diaphragm 22 are each one-half square inch. With zero pressure P3 in cavity 42, no pressure is exerted by cavity 42 over its effective area abutting diaphragm 24. Thus, as shown and with an initial pressure of 20 P.S.I. absolute in tank 14 there will be an upward force of 20 pounds applied to diaphragm 24 and a like amount by diaphragm 24 upward (unopposed by the zero pressure in cavity 42) applied to diaphragm 22. Since tank 12 initially applies an atmospheric pressure of 14.7 P.S.I. to chamber 30 and to the top of diaphragm 22, and diaphragm 22 has an area of one-half square inch, the total downward force applied by diaphragm 22 to diaphragm 24 is 14.7 $\times$ ½ or 7.35 pounds. The differential force required to operate switch 18 is thus, as stated above, 12.65 pounds. The differential pressure (P1–P2) which transducer 10 will affect is represented by the difference in curves 44 and 46 and is initially 5.3 P.S.I. at sea level.

Upon the launching of a vehicle including tank 14, the outside pressure represented by tank 12 would decrease and this would increase the differential pressure (P2–P1) between tanks 12 and 14 and switch 18 would be operated on and it in turn would energize solenoid valve 16 to bleed off pressure from tank 14 to follow the pressure profile represented by curve 46. For example, at an altitude of 32,000 feet, P1 will be 4 P.S.I. (absolute). This 4 P.S.I. pressure will result in a downward force on diaphragm 22 of 2 pounds (4 P.S.I. $\times$ ½ sq. in.). Since a required differential force of 12.65 pounds is required to activate switch 18, pressure P2 will activate the switch at any pressure above 14.65 P.S.I. (12.65 + 2.00). Therefore, the control function would have reduced pressure P2 from 20 P.S.I. (absolute) at sea level to 14.65 P.S.I. (absolute) at 32,000 feet. Thus the differential pressure P2-P1, would have increased from an initial 5.3 P.S.I. to approximately 10.65 P.S.I.

When orbital altitude is reached, altitude in excess of 100,000 feet, P1 will approach 0 P.S.I. and therefore assert no opposing force on the upper side of diaphragm 22. Under this condition, switch 18 will activate solely as a function of P2 on the lower side of diaphragm 24 and since a net force of 12.65 pounds is required to activate switch 18, it will actuate at a 12.65 P.S.I. differential pressure (12.65 lbs. force/1 sq. in. = 12.65 P.S.I.). Thus differential pressure has been varied from 5.3 P.S.I. at sea level to 10.65 P.S.I. at 32,000 feet and to 12.65 P.S.I. at 100,000 feet.

As a matter of comparison, curve 50 shows the effect which would have occurred if a conventional single diaphragm differential pressure transducer were used and the inputs to the transducer were tank pressure and atmospheric pressure. As will be seen, differential pressure (the difference between curves 50 and 44) will remain constant with decrease in atmospheric pressure. In the example shown, characteristics switching pressure of the transducer employed is 5.3 pounds and this would be the differential pressure maintained.

On the other hand, if a fixed reference pressure were employed, of, for example, 14.7 P.S.I., curve 51, the result would be that tank pressure would be maintained at a pressure of 20 P.S.I. (absolute), shown in curve 54, and thus differential pressure would rise from the initial 5.3 P.S.I. at sea level to nearly 20 P.S.I. at 100,000 feet (the difference between curves 44 and 54). While the pressure applied to cavity 42 has been indicated as being a fixed pressure, and the other pressures variable, it is to be appreciated that there may be in practice any combination of fixed and variable pressures. Thus by a combination of pressures and area ratios an extremely wide selection of characteristic curves for curve 46 are possible. For example, by varying the ratio of the proportion of area presented by diaphragm 22 and cavity 42 to diaphragm 24, curve 46 may be infinitely varied between curves 50 and 54.

While the application of the invention has thus far been described particularly in terms of its use in regulating the inside to outside differential pressure of a fuel tank of a space vehicle, the functions performed by the invention has application in many fields. One such field would be in the regulation of tank pressure in underseas vehicles wherein requirements vary as a function of depth of operation. Another and more extensive field exists in the area of industrial controls wherein manufacturing processes often require programmed pressure profiles between one and two or between one, two and three operating pressures.

Figure 3:
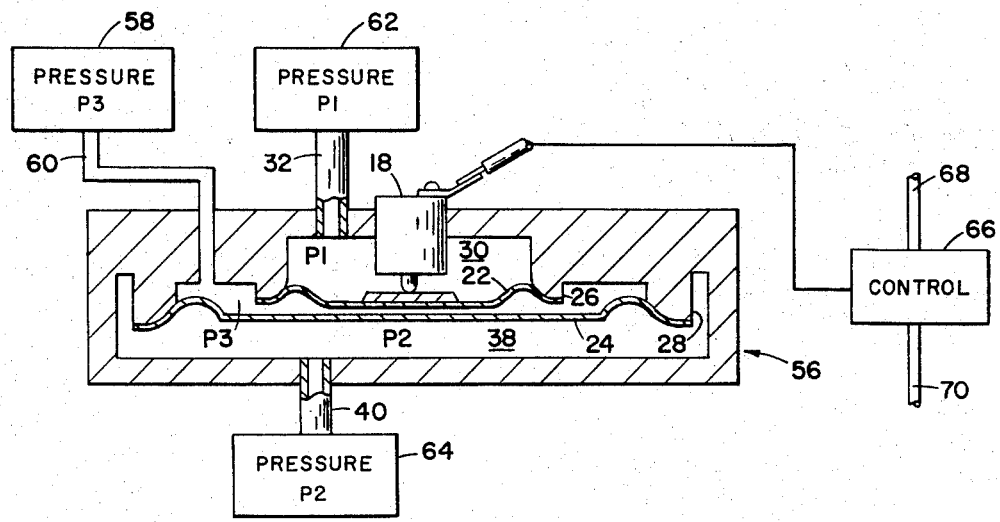
FIG. 3 is a modification of the embodiment of the invention shown in FIG. 1.

As an example of the broader aspects of the invention, FIG. 3 illustrates its application generally as a control system. As shown, pressure transducer 56 is identical to that of transducer 10 of FIG. 1 except that cavity 42 is no longer sealed and it is supplied a pressure P3 from tank 58 through tube 60. Tanks 58, 62 and 64 represent any three related sources of pressure with respect to which it is desired to obtain a control output when their combination of pressures result in the activation of switch 18 in a manner previously described with respect to FIG. 1. When this occurs, control 66, which is activated by switch 18, is operated to effect such control, by means not shown, over one or more of the pressures in tanks 58, 62 and 64, or perform such other function, as desired. Control 66 may be any type of control device operable by pressure switch 18 such as, for example, an electrical relay or solenoid valve. As illustrated, control 66 represents a solenoid valve which controls flow through pipe lines 68 and 70, interconnecting appropriate elements of a pressure system to be controlled.

Thus, it is believed that the invention provides a new and improved pressure control device and system of control wherein a very simple structure may be adapted to provide a wide range of control functions.

What is claimed is:

1. A differential pressure control comprising:

a casing;

a first substantially planar diaphragm inside said casing, said first diaphragm being mounted on first mounting means for supporting the periphery of said first diaphragm on said casing, whereby the central portion of said first diaphragm is movable in a direction normal to planar surfaces thereof in response to a difference in pressure on opposite sides thereof, the outer surface of said first diaphragm and a first interior wall portion of said casing comprising a first pressure chamber;

a second substantially planar diaphragm inside said casing, said second diaphragm being mounted in close proximity to said first diaphragm on second mounting means for supporting the periphery of said second diaphragm on said casing whereby the central portion of said second diaphragm is movable in a direction normal to planar surfaces thereof in response to a difference in pressure on opposite sides thereof and capable of physically touching the central portion of said first planar diaphragm, the outer surface of said second diaphragm and a second interior wall portion of said casing comprising a second pressure chamber;

an enclosed central pressure chamber formed by said first and second diaphragms and by portions of the inner surface of said casing;

a first pressure source;

first coupling means for applying pressure from said first pressure source to the outer planar surface of said first diaphragm and to said first pressure chamber;

a second pressure source;

second coupling means for applying pressure from said second pressure source to the outer planar surface of said second diaphragm and to said second pressure chamber;

diaphragm movement sensing means supported by said casing and responsive to movement of said first diaphragm by said second diaphragm for providing a physical output;

control means responsive to said diaphragm movement sensing means for affecting the pressure in at least one of said pressure chambers whereby a difference in pressures between said first and second sources is obtained which is a selected variable function of the pressure in at least one of said pressure chambers said control means comprising valve means responsive to said diaphragm movement sensing means for connecting said first and second pressure sources in response to a differential pressure which is a selected variable function of the pressure of one of said sources of pressure.

* * * * *